United States Patent [19]

Watanabe et al.

[11] Patent Number: 5,077,362
[45] Date of Patent: Dec. 31, 1991

[54] VINYLIDENE FLUORIDE COPOLYMER AND PROCESS FOR PRODUCING THE SAME

[75] Inventors: Junichi Watanabe, Ageo; Yasushi Yamamoto, Takasaki, both of Japan

[73] Assignee: Shin-Etsu Chemical Co., Ltd., Tokyo, Japan

[21] Appl. No.: 499,975

[22] Filed: Mar. 27, 1990

[30] Foreign Application Priority Data

Mar. 28, 1989 [JP] Japan .................................. 1-76348
Mar. 28, 1989 [JP] Japan .................................. 1-76349

[51] Int. Cl.$^5$ ............................................ C08F 14/22
[52] U.S. Cl. .................................. 526/255; 526/249; 526/279
[58] Field of Search ...................... 526/255, 249, 279

[56] References Cited

U.S. PATENT DOCUMENTS 3,781,251  12/1973  Hermes .
4,701,508  10/1987  Homma et al. ...................... 526/255
4,886,862  12/1989  Kuwamura et al. ................ 526/255

FOREIGN PATENT DOCUMENTS 0185526  6/1986  European Pat. Off. .

Primary Examiner—Joseph L. Schofer
Assistant Examiner—N. Sarofim
Attorney, Agent, or Firm—Oblon, Spivak, McClelland, Maier & Neustadt

[57] ABSTRACT

A vinylidene fluoride copolymer comprising as monomer units:
(A) at least 50 mol % of vinylidene fluoride, and
(B) at least 0.1 mol % of an organosilicon compound containing at least one group selected from the group consisting of the acryloyloxy group, methacryloyloxy group and vinyloxy group, and at least one silicon-bonded vinyl group in the molecule, and a process for producing the same. The copolymer is useful for formation of a thin film or coating on various substrates.

11 Claims, No Drawings

VINYLIDENE FLUORIDE COPOLYMER AND PROCESS FOR PRODUCING THE SAME

BACKGROUND OF THE INVENTION

1. Field of the Invention

This invention relates to a novel vinylidene fluoride copolymer and a process for producing the same.

2. Description of the Prior Art

Since conventional vinylidene fluoride be dissolved in a solvent with difficulty, they are not suited to formation of coating on various substrates. Therefore, it has been difficult to use their excellent properties such as weather resistance and chemical resistance as coating material.

The present inventors have discovered that a novel copolymer of an organosilicon compound having an acryloyloxy, methacryloyloxy or vinyloxy group and a silicon-bonded vinyl group in the molecule and vinylidene fluoride provided by the present invention can dissolve the above prior art disadvantage.

SUMMARY OF THE INVENTION

Accordingly, an object of the present invention is to provide a novel vinylidene fluoride copolymer which has not been known in the prior art.

More specifically, the present invention provides a vinylidene fluoride copolymer comprising as monomer units (A) at least 50 mol % of vinylidene fluoride, and
(B) at least 0.1 mol % of an organosilicon compound containing at least one group selected from the group consisting of the acryloyloxy group, methacryloyloxy group and vinyloxy group, and at least one silicon-bonded vinyl group in the molecule.

The present invention also provides a process for producing said vinylidene fluoride copolymer, comprising the step of radical-copolymerizing a mixture of monomers containing at least 50 mol % of vinylidene fluoride of (A) and at least 0.1 mol % of the organosilicon compound of (B).

Unlike the prior art vinylidene resins, the copolymer of the present invention can be dissolved in a fluorine-containing solvents such as trichlorotrifluoroethane and hydrocarbon solvents such as cyclohexane. Therefore, the copolymer can be used as a solution for formation of a thin film or coating having good weather resistance, chemical resistance, etc. on various substrates.

The copolymer has residual vinyl groups, which can be used in crosslinking reaction with silicone polymers. Hence, it is possible to modify the silicone polymers so as to enhance weather resistance and chemical resistance. It is also possible to form coating stably bound to silicone product substrates.

DETAILED DESCRIPTION OF PREFERRED EMBODIMENTS (A) Vinylidene fluoride

Vinylidene fluoride is one of monomers constituting the copolymer of the present invention. The copolymer contains, as monomer units, at least 50 mol %, preferably from 70 to 99.7 mol % of vinylidene fluoride.

(B) Organosilicon compound

The organosilicon compound of (B) has at least one group selected from the group consisting of the acryloyloxy group, methacryloyloxy group and vinyloxy group, and at least one silicon-bonded vinyl group in the molecule. Such organic compounds include, for example, the compounds represented by the following formula (I)

wherein X represents a hydrogen atom or methyl group, $R^1$ represents a trimethylene group or a group represented by the formula:

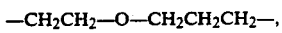

$R^2$ represents a vinyl group or a group represented by the formula:

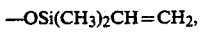

and a is an integer of 1, 2 or 3.

Specific examples of the organosilicon compound of the formula (I) may include, for example, 3-methacryloyloxypropylvinyldimethylsilane, 3-methacryloyloxypropyldivinylmethylsilane, 3-methacryloyloxypropyltrivinylsilane, 3-acryloyloxypropylvinyldimethylsilane, 3-acryloyloxypropyltrivinylsilane, 3-[2-methacryloyloxyethoxy]propylvinyldimethylsilane, 1-(3-methacryloyloxypropyl)-3-vinyl-1,1,3,3-tetramethyl-1,3-disiloxane, 1-(3-acryloyloxypropyl)-3-vinyl-1,1,3,3-tetramethyl-1,3-disiloxane, 1-[3-(2-methacryloyloxyethaoxy)propyl]-3-vinyl-1,1,3,3-tetramethyl-1,3-disiloxane and the like. Among these compounds, preferred are 3-methacryloyloxypropylvinyldimethylsilane, 3-mthacryloyloxypropyltrivinylsilane, 3-[2-methacryloyloxyethoxy]propylvinyldimethylsilane, and 1-(3-methacryloyloxypropyl)-3-vinyl-1,1,3,3-tetramethyl-1,3-disiloxane.

Another example of the organosilicon compound of (B) is represented by the general formula (II):

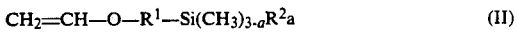

wherein $R^1$, $R^2$ and a are as defined above.

Specific examples of the organosilicon compound of the general formula (II) may include, for example, 3-vinyloxypropylvinyldimethylsilane, 3-vinyloxypropyldivinylmethylsilane, 3-vinyloxypropyltrivinylsilane, 3-vinyloxypropylvinyldimethylsilane, 3-vinyloxypropyltrivinylsilane, 3-[2-vinyloxyethoxy]propylvinyldimethylsilane, 1-(3-vinyloxy)propyl-3-vinyl-1,1,3,3-tetramethyl-1,3-disiloxane, 3-(3-vinyloxy)propyl-1,5-divinyl-1,1,3,5,5-pentamethyl-1,3,5-trisiloxane, 3-(3-vinyloxy)propyl-3-dimethylvinylsiloxy-1,5-divinyl-1,1,5,5-tetramethyl-1,3,5-trisiloxane, 1-[3-(2-vinyloxyethoxy)propyl]-3-vinyl-1,1,3,3-tetramethyl-1,3-disiloxane, and the like. Among these compounds, preferred are 3-vinyloxypropylvinyldimethylsilane, 3-vinyloxypropyltrivinylsilane, 3-[2-vinyloxyethoxy]propylvinyldimethylsilane, and 1-[3-vinyloxypropy103-vinyl-1,1,3,-tetramethyl-1,3-disiloxane.

The copolymer of the present invention contains at least 0.1 mol %, preferably from 0.3 to 30 mol % of the organosilicon compound of (B).

Thus, the copolymer of the invention may essentially consist of from 50 to 99.9 mol % of vinylidene fluoride and 0.1 to 50 mol % of the organosilicon compound of (B).

Other monomers

Alternatively, the copolymer of the present invention may contain a monomer other than vinylidene fluoride of (A) and the organosilicon compound of (B), in addition to these monomers (A) and (B). The other monomer must be copolymerizable with vinylidene fluoride of (A) or the organosilicon compound of (B). Examples of such other monomers may include fluorine-containing monomers such as tetrafluoroethylene, hexafluoropropylene, chlorotrifluoroethylene and the like; α-olefinic monomers such as ethylene, propylene and the like; acrylic monomers such as methyl methacrylate and the like; and so on. These may be used either singly or in combination of two or more. The amount of these monomers in the copolymer is preferably not more than 49.9 mol %, and more preferably not more than 29.7 mol % based on all the monomer units.

Other polymerization conditions

In practicing the process mentioned above, copolymerization can be performed according to any polymerization system such as suspension polymerization, emulsion polymerization, solution polymerization, and mass polymerization. According to the process, a mixture of 50 mol % or more, preferably from 70 to 99.7 mol %, of vinylidene fluoride, 0.1 mol % or more, preferably from 0.3 to 30 mol %, of the organosilicon compound of (B), and optionally the other monomer as described above preferably in an amount of not more than 49.9 mol %, is subjected to polymerization.

Where the copolymer is prepared by suspension polymerization, the radical polymerization initiator to be used may be those generally used. For example, there may be included organic peroxides such as diisopropyl peroxydicarbonate, di-n-propyl peroxydicarbonate, isobutyryl peroxide, and the like; fluorine-containing organic peroxides such as heptafluorobutyryl peroxide, trichloroperfluorohexanoyl peroxide, and the like; azo compounds such as azobisisobutyronitrile and the like. As the polymerization solvent, water is generally employed, but a hydrophobic halogenated hydrocarbon solvent such as trichlorotrifluoroethane, 1,2-dichlorotetrafluoroethane and the like may be also optionally used in combination as desired. Also, if necessary, a chain transfer agent such as acetone, isopropyl alcohol, and t-butyl alcohol; a pH buffering agent; a pH controller, etc. may be also used as desired. As the suspending stabilizer, water-soluble polymer compounds such as methyl cellulose, and polyvinyl alcohol known in the art may be available.

Where the copolymer is prepared by emulsion polymerization, as the water-soluble radical polymerization initiator to be used, those which have been used in the prior art may be employed, including, for example, persulfates such as potassium persulfate and ammonium persulfate.

As the emulsifier, conventional fluorocarbon emulsifiers such as ammonium perfluorooctoate may be used. As for halogenated hydrocarbon solvents, chain transfer agents, pH buffering agents, pH controllers, etc., the same are applicable as in the case of the above-mentioned suspension polymerization.

Where the copolymer is prepared by solution polymerization, polymerization solvents to be used may include the halogenated hydrocarbon solvents as mentioned above, alcoholic solvents and ester solvents. Other components similar to those in the case of suspension polymerization are available.

Polymerization temperature may be suitably selected depending on the polymerization system employed, and may be, for example, about 0° to 100° C.

The pressure during polymerization may be suitably selected depending on the polymerization system, the ratio of monomers charged, the polymerization temperature, etc. Practically a pressure of about 1 to 100 atm is normally employed.

The polymerization time may be also suitably selected depending on the polymerization system, the ratio of the monomers charged, the polymerization temperature, etc. and may be normally about 1 to 50 hours.

In the process of the present invention, the respective components may be charged into a polymerization vessel by charging initially all the amounts of vinylidene fluoride and the organosilicon compound and optionally, other various components used as required, or alternatively by charging a part or all of either one or both of vinylidene fluoride and the organosilicon compound consecutively into a polymerizer continuously or continuously.

The copolymer obtained by the process of the present invention generally has an intrinsic viscosity $[\eta]$ as measured at 30° C. in dimethylformamide as the solvent preferably of 0.05 dl/g or more, more preferably 0.10 dl/g or more. If the intrinsic viscosity is too small, the copolymer may be formed into a thin film with difficulty.

Uses

The copolymer obtained by the process of the present invention is generally soluble in fluorine-containing solvents such as trichlorotrifluoroethane and the like, hydrocarbon solvents such as cyclohexane, and dimethylformamide, and can be easily formed into a thin film or coated onto various substrates.

In the copolymer obtained by the process of the present invention, the vinyl group bonded to silicon atoms in the organosilicon compound of the component (B) has low reactivity in radical copolymerization, and therefore more or less vinyl groups remain in the copolymer obtained. Accordingly, since other silicone polymers can be crosslinked with the residual vinyl groups, the copolymer obtained by the process of the present invention can be used for uses such as various paints, coating materials, rubber materials, etc.

EXAMPLES

In the following, the process of the present invention is described in more detail by referring to Examples and Comparative examples.

EXAMPLE 1

Into a stainless steel ampoule of 100 ml inner volume were charged 0.6 g of 3-methacryloyloxypropylvinyldimethylsilane, 0.2 g of n-propylperoxydicarbonate, and 50 g of trichlorotrifluoroethane. After replacement with nitrogen, the ampoule was internally evacuated to vacuum. Next, 20 g of vinylidene fluoride was charged by pressurization and polymerization was carried out with shaking at 60° C. for 15 hours. After completion of polymerization, unreacted vinylidene fluoride was purged, and the reaction mixture was taken out of the ampoule and dried to give 10.2 g of a copolymer.

The copolymer obtained was found to be soluble in tetrahydrofuran at normal temperature, and could be formed into a uniform film by the casting method. The intrinsic viscosity of the copolymer obtained was measured in dimethylformamide as the solvent at 30° C., and it was found to be 0.30.

EXAMPLES 2–5

Copolymers were obtained in the same manner as in Example 1 except for using the organosilicon compounds shown in Table 1 in place of 3-methacryloyloxypropylvinyldimethylsilane. The yields of the copolymers in the respective examples are shown in Table 1.

The copolymers obtained were all found to be soluble in tetrahydrofuran at normal temperature, and could be formed into uniform films by casting. The intrinsic viscosities [$\eta$] of the copolymers were measured in dimethylformamide as the solvent at 30° C. The results are shown in Table 1.

TABLE 1

| Example | Organosilicon compound | Yield of copolymer (g) | Intrinsic viscosity |
|---------|------------------------|------------------------|---------------------|
| 2 | 3-Methacryloyloxypropyl-trivinylsilane | 8.5 | 0.26 |
| 3 | 3-Acryloyloxypropyl-vinylidimethylsilane | 9.2 | 0.28 |
| 4 | 3-[2-Methacryloyloxyethoxy]-propylvinyldimethylsilane | 10.3 | 0.30 |
| 5 | 1-(3-Methacryloyloxypropyl)-3-vinyl-1,1,3,3-tetramethyl-1,3-disiloxane | 7.8 | 0.22 |

EXAMPLE 6

Into a stainless steel reactor of one-liter inner volume were charged 500 ml of pure water, 2.3 g of ammonium perfluorooctylcarboxylate, 5 g of 3-methacryloyloxypropylvinyldimethylsilane and 1.2 g of ammonium persulfate, and the reactor after replaced internally with nitrogen was evacuated to vacuum. Next, 100 g of hexafluoropropylene was charged, and then 130 g of vinylidene fluoride was charged, followed by polymerization at 70° C. for 15 hours. After completion of polymerization, the unreacted monomers were purged, and the reaction mixture was taken out of the reactor. Thus, 105 g of a rubbery copolymer was obtained.

The copolymer obtained was found to be soluble in tetrahydrofuran at normal temperature, and could be formed into a uniform film by the casting method. The intrinsic viscosity of the copolymer obtained was measured in dimethylformamide as the solvent at 30° C., and it was found to be 0.40.

EXAMPLE 7

Into a stainless steel ampoule of 100 ml inner volume were charged 0.5 g of 3-vinyloxypropylvinyldimethylsilane, 0.2 g of n-propylperoxydicarbonate, and 50 g of trichlorotrifluoroethane. After replacement with nitrogen, the ampoule was internally evacuated to vacuum. Next, 20 g of vinylidene fluoride was charged by pressurization and polymerization was carried out with shaking at 60° C. for 15 hours. After completion of polymerization, unreacted vinylidene fluoride was purged, and the reaction mixture was taken out of the ampoule and dried to give 8.3 g of a copolymer.

The copolymer obtained was found to be soluble in tetrahydrofuran at normal temperature, and could be formed into a uniform film by the casting method. The intrinsic viscosity of the copolymer obtained was measured in dimethylformamide as the solvent at 30° C., and it was found to be 0.25.

EXAMPLE 8

A copolymer in an amount of 6.2 g was obtained in the same manner as in Example 1 except for using 3-vinyloxypropyltrivinylsilane in place of 3-vinyloxypropylvinyldimethylsilane.

The copolymer obtained was found to be soluble in tetrahydrofuran at normal temperature, and could be formed into uniform film by casting. The intrinsic viscosity of the copolymer was measured in dimethylformamide as the solvent at 30° C., to be 0.22.

EXAMPLE 9

A copolymer (8.7 g) was obtained in the same manner as in Example 1 except for using 3-[2-vinyloxyethoxy]-propylvinyldemthylsilane in place of 3-vinyloxypropylvinyldiemthylsilane.

The copolymer obtained was soluble in tetrahydrofuran at normal temperature, and could be formed into a uniform film by the casting method. The intrinsic viscosity of the copolymer was measured at 30° C. using dimethylformamide as the solvent, to be 0.25.

EXAMPLE 10

A copolymer (6.7 g) was obtained in the same manner as in Example 1 except for using 1-(3,-vinyloxy)propyl-3-vinyl-1,1,3,3-tetramethyl-1,3-disiloxane in place of 3-vinyloxypropylvinyldimethylsilane.

The intrinsic viscosity of the copolymer obtained was measured at 30° C. using dimethylformamide as the solvent, to be 0.18.

EXAMPLE 11

Into a stainless steel reactor of one-liter inner volume were charged 600 ml of pure water, 2.3 g of ammonium perfluorooctylcarboxylate, 5 g of 3-vinyloxypropylvinyldimethylsilane and 2.3 g of n-propylperoxydicarbonate, and the reactor after replaced internally with nitrogen was evacuated to vacuum. Next, 100 g of hexafluoropropylene was charged, and then 130 g of vinylidene fluoride was charged, followed by polymerization at 60° C. for 20 hours. After completion of polymerization, the unreacted monomers were purged, and the reaction mixture was taken out of the reactor. Thus, 65 g of a rubbery copolymer was obtained.

The copolymer obtained was found to be soluble in tetrahydrofuran at normal temperature, and could be formed into a uniform film by the casting method. The intrinsic viscosity of the copolymer obtained was measured in dimethylformamide as the solvent at 30° C., and it was found to be 0.42.

We claim:

1. A vinylidene fluoride copolymer having a silicon-bonded vinyl group comprising as monomer units:
   (A) at least 50 mol % of vinylidene fluoride, and
   (B) at least 0.1 mol % of an organosilicon compound containing at least one group selected from the group consisting of the acryloxyloxy group, methacryloyloxy group and vinyloxy group, and at least one silicon-bonded vinyl group in the molecule.

2. The vinylidene fluoride copolymer according to claim 1 essentially consisting of from 50 to 99.9 mol % of vinylidene fluoride and from 0.1 to 50 mol % of said organosilicon compound of (B).

3. The vinylidene fluoride copolymer according to claim 1 further comprising as monomer units at least one compound selected from the group consisting of tetrafluoroethylene, hexafluoropropylene, chlorotrifluoroethylene, ethylene, propylene and methyl methacrylate.

4. The vinylidene fluoride copolymer according to claim 1, wherein the organosilicon compound of said (B) is represented by the formula (I):

$$CH_2=\overset{X}{\underset{|}{C}}-COO-R^1-Si(CH_3)_{3-a}R^2_a \qquad (I)$$

wherein X represents a hydrogen atom or methyl group, $R^1$ represents a trimethylene group or a group represented by the formula:

$$-CH_2CH_2-O-CH_2CH_2CH_2-,$$

$R^2$ represents a vinyl group or a group represented by the formula:

$$-OSi(CH_3)_2CH=CH_2,$$

and a is an integer of 1, 2 or 3.

5. The vinylidene fluoride copolymer according to claim 4, wherein the compound of the general formula (I) is selected from the group consisting of 3-methacryloyloxypropylvinyldimethylsilane, 3-methacryloyloxypropyltrivinylsilane, 3-[2-methacryloyloxyethoxy]propylvinyldimethylsilane, and 1-(3-methacryloxyloxypropyl)-3-vinyl-1,1,3,3-tetramethyl-1,3-disiloxane.

6. The vinylidene fluoride copolymer according to claim 1, wherein the organosilicon compound of said (B) is represented by the formula (II);

$$CH_2=CH-O-R^1-Si(CH_3)_{3-a}R^2a \qquad (II)$$

wherein X represents a hydrogen atom or methyl group, $R^1$ represents a trimethylene group or a group represented by the formula:

$$-CH_2CH_2-O-CH_2CH_2CH_2-,$$

$R^2$ represents a vinyl group or a group represented by the formula:

$$-OSi(CH_3)_2(CH=CH_2,$$

and a is an integer of 1, 2 or 3.

7. The vinylidene fluoride copolymer according to claim 6, wherein the compound of the general formula (II) is selected from the group consisting of 3-vinyloxypropylvinyldimethylsilane, 3-vinyloxypropyltrivinylsilane, 3-vinyloxypropyltrivinylsilane, 3-[2-vinyloxypropyl103-vinyl-1,1,3-tetramethyl-1,3-disiloxane.

8. The vinylidene fluoride copolymer according to claim 1, wherein said mixture of monomers contains from 70 to 99.7 mol % of vinylidene fluoride of (A).

9. The vinylidene fluoride copolymer according to claim 1, wherein said mixture of monomers contains from 0.3 to 30 mol % of the organosilicon compound of (B).

10. The vinylidene fluoride copolymer according to claim 1, wherein the said mixture of monomers further comprises other monomers copolymerizable with vinylidene fluoride (A) or the organosilicon compound of (B).

11. The vinylidene fluoride copolymer according to claim 10, wherein said other monomer is selected from the group consisting of tetrafluoroethylene, hexafluoropropylene, chlorotrifluoroethylene, ethylene, propylene and methyl methacrylate.

* * * * *